(12) United States Patent
Baruch et al.

(10) Patent No.: US 7,203,651 B2
(45) Date of Patent: Apr. 10, 2007

(54) VOICE CONTROL SYSTEM WITH MULTIPLE VOICE RECOGNITION ENGINES

(75) Inventors: Amit Baruch, Tel Aviv (IL); Ran Mochary, Nes Ziona (IL); Itay Riemer, Tel-Aviv (IL); Nir Ben-Dor, Holon (IL); Tal Yadid, Rosh Haain (IL); Eran Aharonson, Ramat Hasharon (IL)

(73) Assignee: ART-Advanced Recognition Technologies, Ltd. (IL)

( * ) Notice: Subject to any disclaimer, the term of this patent is extended or adjusted under 35 U.S.C. 154(b) by 410 days.

(21) Appl. No.: 10/005,314

(22) Filed: Dec. 7, 2001

(65) Prior Publication Data

US 2002/0091518 A1    Jul. 11, 2002

Related U.S. Application Data

(60) Provisional application No. 60/254,644, filed on Dec. 7, 2000.

(51) Int. Cl.
G10L 11/00 (2006.01)

(52) U.S. Cl. .................... 704/270.1; 704/270

(58) Field of Classification Search ............. 704/270.1; 379/88.03, 88.07
See application file for complete search history.

(56) References Cited

U.S. PATENT DOCUMENTS

| | | | |
|---|---|---|---|
| 5,165,095 A * | 11/1992 | Borcherding | 379/88.03 |
| 6,003,004 A * | 12/1999 | Hershkovits et al. | 704/253 |
| 6,061,646 A * | 5/2000 | Martino et al. | 704/3 |
| 6,125,341 A * | 9/2000 | Raud et al. | 704/8 |
| 6,167,118 A * | 12/2000 | Slivensky | 379/88.03 |
| 6,230,138 B1 | 5/2001 | Everhart | |
| 6,260,012 B1 | 7/2001 | Park | |
| 6,377,922 B2 * | 4/2002 | Brown et al. | 704/251 |
| 6,501,966 B1 | 12/2002 | Bareis et al. | |
| RE38,101 E * | 4/2003 | Vysotsky et al. | 379/88.03 |
| 6,549,883 B2 * | 4/2003 | Fabiani et al. | 704/10 |
| 6,839,670 B1 * | 1/2005 | Stammler et al. | 704/251 |

OTHER PUBLICATIONS

Savaraj I. Pawate, Peter Ehlig, "Dialing a Phone by Voice", Machine Design, Jan. 10, 1991.
Thomas B. Schalk, "Voice Recognition in Cellular Mobile Phones", Speech Technology, Sep./Oct. 1986.

* cited by examiner

Primary Examiner—David Hudspeth
Assistant Examiner—Brian L. Albertalli
(74) Attorney, Agent, or Firm—Bromberg & Sunstein LLP

(57) ABSTRACT

Described is a control unit including a recognition result receiver able to receive a recognition result, a recognition result association unit having associations of results with recognition engines, and a recognition engine activator able to activate the recognition engine associated with the recognition result. Also described is a device including a microphone, an analog to digital converter able to convert input received by the microphone, a first speech recognition engine adapted to perform a first type of recognition on an output of the analog to digital converter, and a second recognition engine adapted to perform a second type of recognition on the output.

11 Claims, 2 Drawing Sheets

VOICE CONTROL SYSTEM WITH MULTIPLE VOICE RECOGNITION ENGINES

CROSS REFERENCE TO RELATED APPLICATIONS

This application claims the priority of U.S. Provisional Patent Application No. 60/254,644, filed Dec. 7, 2000 (entitled "Voice Control System With Multiple Voice Recognition Engines"), which is incorporated in its entirety herein by reference.

FIELD OF THE INVENTION

The present invention relates generally to speech recognition systems and more particularly to voice controlled systems.

BACKGROUND OF THE INVENTION

Voice recognizers are well known in the art and are used in many applications. For example, voice recognition is used in command and control applications for mobile devices, in computer Dictaphones, in personal digital assistants (PDAs), in children's toys, in appliances, and in car telephones.

Various types of speech recognition engines are well known in the art. If individual voice training is possible, a speaker dependent engine will be used. If no user training is allowed, a pretrained speaker independent engine is used. For any given application or device, the engine deemed most appropriate is used.

SUMMARY OF THE INVENTION

There is provided, in accordance with an embodiment of the present invention, a control unit including a recognition result receiver able to receive a recognition result, a recognition result association unit having associations of results with recognition engines, and a recognition engine activator able to activate the recognition engine associated with the recognition result. Moreover, in accordance with an embodiment of the present invention, the control unit may further include a device communicator able to send feedback commands to a device. Furthermore, in accordance with an embodiment of the present invention, the device may be selected from the group consisting of a telephone, a computer, a car accessory, a lock, a PDA, an audio device, a video device, and a voice controlled appliance. A telephone herein refers to all types of audio communication devices including a landline telephone, portable telephone, cellular telephone, wireless telephone, headset telephones etc.

There is provided, in accordance with an embodiment of the present invention, a device including a microphone, an analog to digital converter able to convert input received by the microphone, a first speech recognition engine adapted to perform a first type of recognition on an output of the analog to digital converter, and a second recognition engine adapted to perform a second type of recognition on the output. Moreover, in accordance with an embodiment of the present invention, the device may further include a vocoder. Furthermore, in accordance with an embodiment of the present invention, the first type of recognition and the second type of recognition may be selected from the group consist of a speaker independent commands and control engine, a speaker independent name dialing engine, a speaker dependent name dialing engine, a speaker independent digit dialing multilanguage engine, and a speaker dependent digit dialing language independent engine.

There is also provided, in accordance with an embodiment of the present invention, a voice controlled apparatus including at least two speech recognition engines, and a control unit able to switch between the engines based on the recognition results of the engines. Moreover, in accordance with an embodiment of the present invention, the voice controlled apparatus may further include a vocoder. Furthermore, in accordance with an embodiment of the present invention, at least two speech recognition engines may be selected from the group consisting of a speaker independent commands and control engine, a speaker independent name dialing engine, a speaker dependent name dialing engine, a speaker independent digit dialing multilanguage engine, and a speaker dependent digit dialing language independent engine. Still further, in accordance with an embodiment of the present invention, the voice controlled apparatus may further include a user feedback unit which may be selected from the group consisting of a speaker and a display unit.

There is also provided, in accordance with an embodiment of the present invention, a method that includes recognizing a first audio input by a first recognition engine, activating a second recognition engine previously associated with the recognized input, and recognizing a second audio input by the second recognition engine. Moreover, in accordance with an embodiment of the present invention, the method may further include sending feedback to a user.

There is also provided, in accordance with an embodiment of the present invention, a method including recognizing an audio input by a first recognition engine, recognizing the audio input by a second recognition engine, and choosing between a first recognized result of the first engine and a second recognized result of the second engine. Moreover, in accordance with an embodiment of the present invention, the method may further include activating a recognition engine.

There is also provided, in accordance with an embodiment of the present invention, a device including a microphone, an analog to digital converter able to convert input received by the microphone, a first speech recognition engine adapted to perform a first type of recognition on an output of the analog to digital converter, a second recognition engine adapted to perform a second type of recognition on the output, and a speaker able to provide audio feedback related to at least one recognition result from the first and the second recognition engine.

There is also provided, in accordance with an embodiment of the present invention, a voice controlled telephone including a recognition result receiver able to receive a recognition result, a recognition result association unit having associations of results with recognition engines, a recognition engine activator able to activate the recognition engine associated with the recognition result, and a speaker able to provide audio feedback related to the recognition result.

There is also provided, in accordance with an embodiment of the present invention, a voice controlled telephone including a microphone able to receive voice input, an analog to digital converter able to convert the input, at least two speech recognition engines able to perform recognition on an output of the analog to digital converter, and a control unit able to switch between modes of operation based on the output.

There is also provided, in accordance with an embodiment of the present invention, a voice controlled telephone including a recognition result receiver able to receive a recognition result, a recognition result association unit having associations of results with recognition engines, and a recognition engine activator able to activate the recognition engine associated with the recognition result.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The system and method of the present invention use more than one speech recognition engine in a single device. Each engine may be related to at least one operation mode of the system. Alternatively, each mode of operation may correspond to at least one recognition engine from a plurality of engines. The use of multiple recognition engines may allow a reduction in the required memory, the computation load, the complexity of the system, and the processing time. Switching between modes may occur based on recognized spoken commands, and the switching may be controlled by the method of the present invention.

Furthermore, in an embodiment of the present invention, each recognition engine may be loaded and unloaded independently. This feature may allow for the changing of any single recognition engine to a more appropriate engine or for upgrading of the current engine without affecting other engines. It is understood that there are many other advantages and embodiments of the present invention, as will be explained hereinbelow.

Whereas the description below may refer to a communication system more specifically to dialing on a wireless telephone, it is to be understood that any such references are for exemplary purposes only. Furthermore, a telephone herein refers to all types of audio communication devices including a landline telephone, portable telephone, cellular telephone, wireless telephone, headset telephones etc. The present invention may also apply to PDAs, computers, locks, car accessories, audio/visual equipment, other voice operated appliances and the like. It is further noted that any of these devices may be controlled by voice input alone. Still further, it is noted that the audio input may be received at a point remote from the device itself and may be transmitted to the device by any appropriate means.

Figure 1:
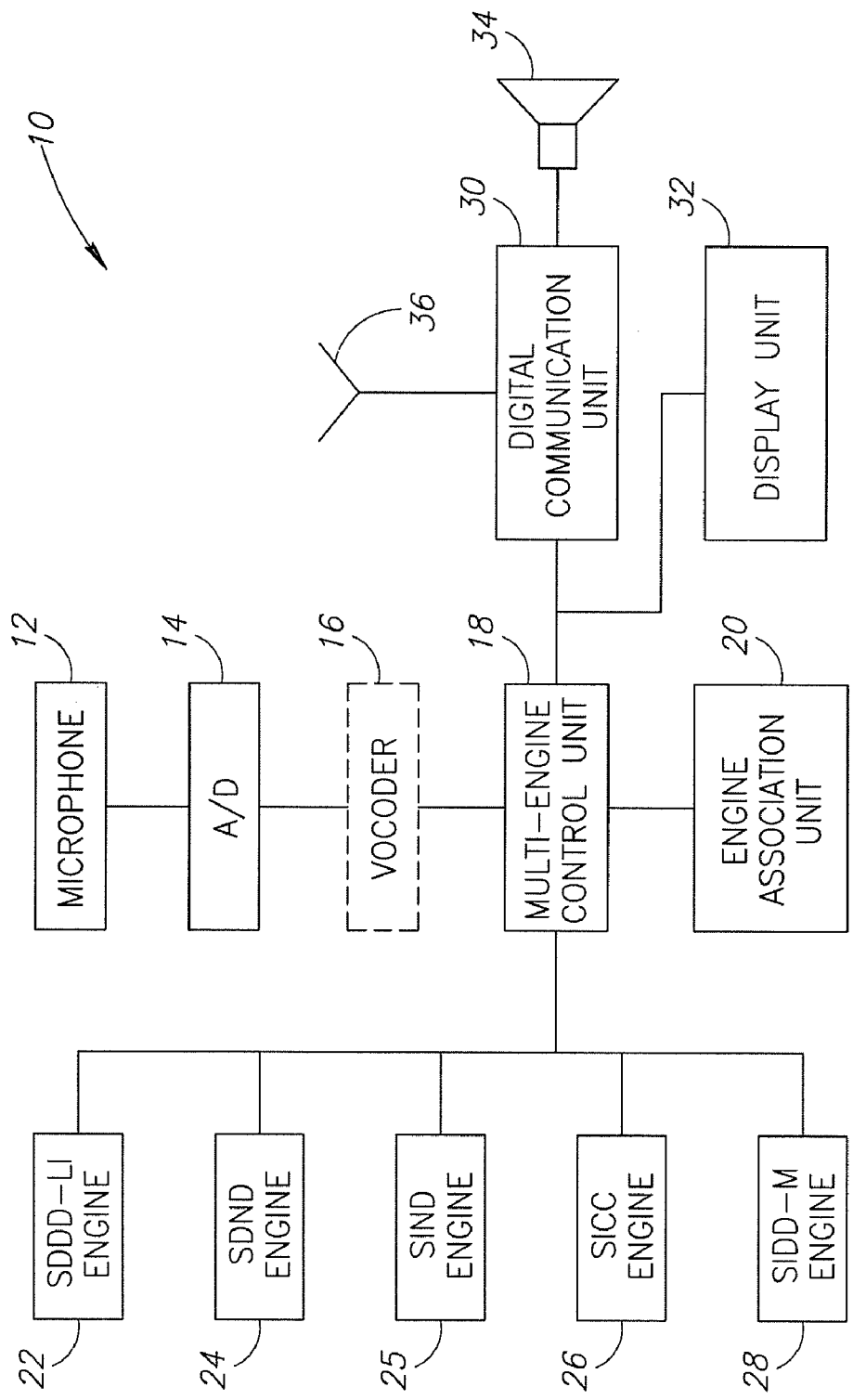
FIG. 1 is a block diagram illustration of a voice recognition system and communication device embodying more than one speech recognition engine, operative in accordance with an embodiment of the present invention.

Reference is now made to FIG. 1, a block diagram illustration of a voice recognition system and communication device 10 embodying more than one speech recognition engine, operative in accordance with an embodiment of the present invention. The system may comprise both speaker dependent and speaker independent recognition engines as well as other types of recognition engines.

In an embodiment of the present invention, device 10 may comprise any of the following exemplary recognition engines: speaker dependent engine—digit dialing language independent (SDDD-LI); speaker dependent engine—name dialing (SDND); speaker independent engine—name dialing (SIND); speaker independent engine—commands and control (SICC); and speaker independent engine—digit dialing multilanguage (SIDD-M), which are referenced 22, 24, 25, 26 and 28 respectively. It is noted that any speech recognition engine known in the art may be used for recognition, for example, the speaker independent speech engine disclosed in U.S. Pat. No. 6,003,004 to Hershkovits, et al. or the speaker dependent speech engine disclosed in U.S. Pat. No. 6,260,012 to Park.

Device 10 may further comprise a microphone 12, an analog to digital converter (A/D) 14, an optional vocoder 16, a multi-engine control unit 18 (hereinbelow referred to as control unit 18), an engine association unit 20, a digital communication unit 30, an optional display unit 32, an optional antenna 36, and an optional loudspeaker 34. Engine association unit 20 may comprise the association between specific commands or phrases and a recognition engine from among recognition engines 22–28. Device 10 may further comprise recognition libraries associated with the plurality of recognition engines. These may be stored in engine association unit 20, in control unit 18, or within the engines themselves. In an exemplary embodiment of the present invention, loudspeaker 34 may be a telephone speaker.

Control unit 18 may be directly connected to recognition engine units SDDD-LI 22, SDND 24, SIND 25, SICC 26, and SIDD-M 28, and to vocoder 16, digital communication unit 30 and engine association unit 20. Digital communication unit 30 may be further connected to antenna 36 and loudspeaker 34. Display unit 32 may be connected to control unit 18 and digital communication unit 30. Analog to digital converter 14 may be connected to microphone 12 and to vocoder 16.

Microphone 12 may receive an audio signal, which it may convert into an electric signal and which it may further provide to A/D unit 14. A/D unit 14 may convert the analog electric signal into a digital signal and may provide it to vocoder 16. Vocoder 16 may encode the signal and may provide the compressed signal to control unit 18.

In a further embodiment of the present invention, vocoder 16 may be bypassed or may not be present. Instead, the original (non-compressed) digital signal may be input directly to control unit 18 from A/D 14.

In a further embodiment of the present invention, the digital or compressed signal may arrive from another device through a communication network such as a cellular network, the Internet, a local area network (LAN), a bluetooth connection etc. Still further, speech recognition features may be used directly instead of the digital speech signal or the compressed speech presented by vocoder 16. An example of such a use is given in the ETSI (European Telecommunications Standards Institute) standard for DSR (distributed speech recognition), as standard number "ETSI ES 201 108 V1.1.2 (2000–04)".

Control unit 18 may manage the speech recognition process. Upon recognition of an input, it may check engine association unit 20 to find the correct recognition engine, from among the plurality of engines, to activate for recognition of the next input.

After recognition, control unit 18 may further display messages on display unit 32, and may send commands to the digital communication unit 30 when appropriate. This is shown specifically hereinbelow with respect to the recognition results of specific engines. It is understood however, that audio/visual feedback may occur for any recognition result as appropriate. It is further understood that audio/visual feedback is not necessary and means for audio/visual feedback may not be present in device 10.

When device 10 is turned on, the SICC mode may be invoked, SICC engine unit 26 may be activated and the system may wait for commands. The device may be turned on in a manner appropriate to the particular device. For example, if the device is a telephone, it may contain an "on/off" button, as shown hereinbelow with respect to FIG. 2.

SICC mode may comprise a plurality of commands, which, when recognized by SICC engine 26, may cause an associated action to be invoked. Exemplary commands may include CALL, DIAL, ADDRESS BOOK, MESSAGES, CALENDAR, TO DO, MEMO, CLEAR, PREVIOUS, NEXT, UP, DOWN, YES, NO, FAX, E-MAIL and the like.

SICC engine 26 may recognize the signal it receives as a command from the plurality of commands stored in its associated library. If the signal is recognized, control unit 18 may check engine association unit 20 for the engine associated with the recognized command. If there is one, control unit 18 may change the recognition engine being used ad may activate a recognition engine flat has been preassociated with the recognize command. If a signal is not recognized, system 10 may provide visual (via display unit 32) and/or audible (via loudspeaker 34) feedback and may resume waiting for the receipt of a command. A feedback message may be, for example, "sorry, bad command" or the like.

In another embodiment of the present invention, a speaker dependent speech recognition engine may be used either instead of or in parallel exemplary SICC engine 26. In order to use a speaker dependent engine, the user may have to train any desired commands.

If the voice command CALL is recognized, system 10 may switch into SIND and/or SDND mode. Thus, any audio, input may be fed into more than one separate recognition engine generally simultaneously or serially. In both of these modes, any voice input may be interpreted as a target name. Either one or both of these modes may be used. Each mode may have advantages, and hence the use of both together may provide better results.

The voice recognition system Ray recognize the input name from a previously provided reference list and may provide for example a telephone number associated with the recognized name. In this exemplary case, the telephone number may then be dialed. The result is that the user may be connected to his destination without having to look up a telephone number and/or use his hands to dial the number.

SIND engine unit 25 may recognize spoken names according to their textual representation. For example, SIND engine unit 25 may recognize the names written in a phonebook, SIND engine unit 25 may use a text to phoneme conversion module and a phoneme-based recognition module. The text to phoneme module may convert the text representation of each name to a network of possible phonemes. The phoneme-based recognition module may search the network of the possible phonemes to find the best path. This may be done using phoneme-based acoustic models, which may be stored in engine association unit 20 or may be embedded in the code of SIND engine unit 25.

SIND engine unit 25 may not require, the training of the voice recognition system, as it is a speaker independent system. However, there are systems that allow adaptation of the speaker independent models for a specific user by, for example, letting the user say a small number of phrases.

SDND engine unit 24 may search in a user-specific "name dialing" library (NDL) for the input name. This library may be stored in engine association at 20. This library may be, for example, in the form of a look-up table with a one-to-one correspondence between a target name and the associated dialing number. It is noted that at least one NDL may be associated with each user.

As SDND engine 24 is speaker dependent, the recognition engine may have to be trained prior to use. However, SDND engine 24 may recognize any utterance that may have been trained by the user, for example, a name that is different from the one written in the phonebook. For example, it may recognize it as a nickname, as it is not limited to the text written in the address boot as may be SIND engine 25. If the contact name in the address book is, for example, John Smith, then SIND engine 25 would recognize only "John Smith", "John", or "Smith", i.e. the full name or parts of the name of this contact. Using SDND engine 24, any vocalization may be trained to match this contact, e.g. "father". Therefore, the user may be able to say not only "John Smith", "John", or "Smith", which may be recognized by SIND engine 25, but he may also say "Father", which may not be recognized by SIND engine 25 but may be recognized by SDND engine 24.

When name recognition is being performed, the uttered name may be input to SDND engine unit 24 and/or SIND engine unit 25. Each engine may return its own recognition result, which may comprise either a recognized name or a recognition failure message. If only one engine is used, its result may be used directly. If both engines are used generally simultaneously, a decision rule may be applied, either to choose the "winning" recognition result or to reject the utterance as having not being recognized. This decision rule may be based on a combination of several parameters, such as the confidence level of each result, the noise level of the input, etc. The decision rule may be any data driven rule system or rule based system such as a neural network, Bayesean network, support vector machine, fuzzy logic, and so on.

If the voice input is recognized as one of the target names, digital communication unit 30 may perform the action that may be required to establish connection with the target, for example by dialing a telephone number.

If the voice input is not recognized, system 10 may provide a visual (via display unit 32) and/or audible (via loudspeaker 34) message to the user and may continue to wait for another name to be received. The feedback message may be, for example, "sorry, bad command" or the like. Alternatively, system 10 may suggest that the user input an entry, for example a new telephone number, which may then be associated with the unrecognized name. In this case, the user may either reject the suggestion and input another name (or repeat the same name once again), or accept the suggestion and add a new number to the NDL. Consequently, the recognition engine used may be switched or additional engines activated.

It is noted that the NDL may be created, extended, or edited by the use of an operation mode corresponding to a predetermined command. This operation mode may be invoked in the SICC mode, for example, upon recognition of the appropriate command from the plurality of allowable commands, for example, ADDRESS BOOK. It is further noted that the NDL may be created using training to increase the recognition probability.

Upon recognition of the command DIAL by SICC engine 26, system 10 may switch into the digit-dialing mode, which may include the SIDD-M and/or the SDDD-LI modes. For the SIDD-M mode, at least one speaker-independent digit recognizer SIDD-M 28 may be activated, whereas for the SDDD-LI mode at least one speaker-dependent digit recognizer, SDDD-LI 22 may be activated.

Each language-specific digit recognizer may perform the recognition of the spoken digits in any of the languages it recognizes. Device 10 may contain a list of available languages, which the user may choose from, for example when setting the properties of device 10. A list of available languages, for example a subset comprising the previously selected languages, may be displayed on display unit 32. The user may navigate this list to choose a language, for example using verbal commands such as UP or DOWN and/or using buttons or other appropriate physical means. In another embodiment of the invention, the user may choose the language by uttering its name. Still further, this list may be provided by loudspeaker 34 alone.

The list of available languages may also contain a selection of "custom" languages, which may cause the selection of a speaker dependent recognizer, SDDD-LI 22 instead of a speaker independent recognizer. For each language, including any "custom" languages, engine association unit 20 may comprise at least one corresponding digit dialing library (DDL), which may comprise voice models or templates for digits. Digits in this application may include, for example, the digits from 0 to 9 and other predetermined entries such as pound (#), star (*), pause, and plus (+). Furthermore, digits with more than one accepted pronunciation, like Oh and Zero for "0", and star and times for "*", may have more than one template.

In a further embodiment of the present invention, an adaptation stage may be added to SIDD-M recognizer 28, in which the speaker-independent voice models may be adapted to the user-specific pronunciation of the digits in the selected language.

The SDDD-LI mode may allow the creation of additional DDLs, for example, DLLs that may be adjusted to user-specific pronunciation, may correspond to languages that are not contained in the database, and the like. The process of custom DDL creation may include training. During the training the user may pronounce the vocables corresponding to the digits and/or digit sequences. After the training is completed the new DDL may be added to the existing database of libraries stored in engine association unit 20 and the user may use the newly created DDL, for example to dial a number.

In a further embodiment of the present invention, recognition of the command DIAL by SICC engine 26 system 10 may invoke name dialing recognition libraries in addition to or instead of the digit dialing libraries. It is thus to be understood that any number of recognition libraries in any combination is possible. Decisions regarding which recognition result to choose are made as described hereinabove with respect to the CALL command.

In a further embodiment of the present invention, system 10 may include additional recognition engines for execution of activities other dialing, for example, for scheduling appointments, recording memos, sending and receiving fax and e-mail messages and the like. Exemplary added commands may include MESSAGES, CALENDAR, TO DO, MEMO, CLEAR, PREVIOUS, NEXT, FAX, and E-MAIL. Navigation through any command lists and menus, as well as command execution may be performed by voice, using various languages and feature-specific command libraries in an analogous manner to that described herein. Upon recognizing an appropriate command, the recognition mode may be switched as necessary. For example, upon recognition of the command CALENDAR, a recognition engine for dates and times may be activated.

In a further embodiment of the present invention, at any point, system 10 may require confirmation from the user before proceeding and therefore may provide a verbal/visual "Yes/No" prompt. If the user responds verbally, recognition of the confirmation response may be implemented by any appropriate recognition technique. Possible techniques may be activation of a speaker-independent "Yes/No" recognizer, activation of speaker dependent recognizer that may have been red with the words "Yes" and "No", or by navigation of a "Yes/No" menu as described hereinabove.

Figure 2:
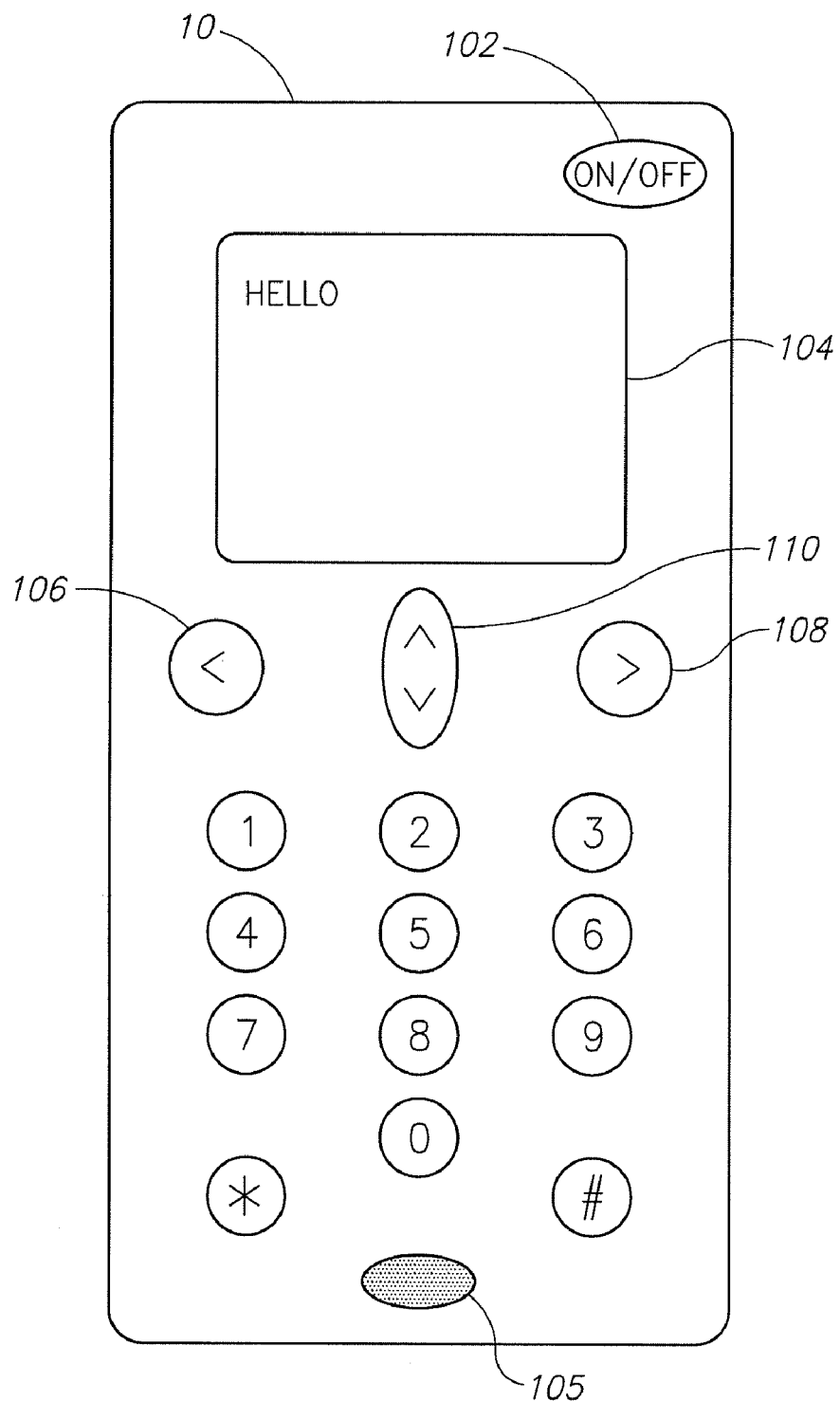
FIG. 2 is a schematic illustration of an exemplary communication device comprising the voice recognition system of FIG. 1, operative in accordance with an embodiment of the present invention.

Reference is now made to FIG. 2, a schematic illustration of an exemplary device 10, operative in accordance with an embodiment of the present invention. An exemplary embodiment of a telephone incorporating the voice recognition system of the present invention is shown. Device 10 comprises an on/off button 102, a screen 104, an audio unit 105, buttons with the digits 0–9, *, and #, and arrow buttons 106, 108, and 110 corresponding to left, right, and up/down respectively.

Audio unit 105 comprises a combination microphone/speaker. Audio unit 105 may be used to play feedback messages and user prompts and to receive voice input as described hereinabove.

Screen 104 corresponds to display unit 32 of FIG. 1. It may be used to display feedback messages and user prompts as described hereinabove. Arrow buttons 106, 108, and 110 may be used to scroll through command lists and menus as described hereinabove.

Each of the digit buttons 0–9, *, and #, and allow buttons 106, 108, and 110 may have corresponding templates in any of the speaker dependent or independent recognition engines comprised by device 10. It may be possible to obtain the same results using the buttons or voice commands. Thus, for example, in addition to using voice-activated switching from one operation mode to another, pressing arrow buttons 106, 108 and 110 when scrolling through a menu may cause the same operations to be executed.

A further exemplary embodiment of the present invention may be a telephone without any buttons or display. In such an embodiment, input may be by voice only. Such an embodiment may be a cellular telephone headset when the telephone unit itself is not accessible or visible as when it is in a pocket. Another example of such an embodiment may be a handsfree-eyesfree car kit.

It is understood that the ideas regarding multiple voice recognition engines that have been disclosed above may also be applied to PDAs, computers, locks, car accessories, audio/visual equipment, other voice operated appliances and the like in a manner analogous to that described hereinabove.

Furthermore, it will be appreciated by persons skilled in the art that the present invention is not limited by what has been particularly shown and described herein above. Rather the scope of the invention is defined by the claims that follow:

What is claimed is:

1. A device comprising:
  a feature command speech recognition unit to perform recognition of a user command requesting a non-dialing feature of said device;
  at least two speech recognition engines each specific to one non-dialing feature of the device to perform recognition on a voice input; and
  a control unit to activate at least one of said at least two non-dialing feature-specific speech recognition engines in accordance with output of said feature command speech recognition unit and to operate said non-dialing feature of said device using recognition results from said selected non-dialing feature-specific speech recognition engine whenever user input is required.

2. The device according to claim 1 and wherein said device is selected from the group consisting of a telephone, a computer, a car accessory, a lock, a PDA, an audio device, a video device, and a voice controlled appliance.

3. The device according to claim 2 and wherein said telephone is a telephone selected from the group consisting of: a landline telephone, a portable telephone, a cellular telephone, a wireless telephone and a headset telephone.

4. The device according to claim 1 and comprising a loader to load and unload said speech recognition engines independently of each other.

5. The device according to claim 1 wherein said feature commands are a function of the type of device which said device is.

6. The device according to claim 1 and wherein said feature commands are selected from the group consisting of: MESSAGES, CALENDAR, TO DO, MEMO, FAX and EMAIL.

7. The device according to claim 1 and wherein one feature is associated with at least two speech recognition engines and said control unit activates said at least two speech recognition engines in parallel.

8. A cellular telephone comprising:
at least two speech recognition engines each specific to one non-dialing feature of the device to perform recognition on a voice input; and
a control unit to select at least one of said non-dialing feature-specific recognition engines based on user input and to operate said non-dialing feature of said cellular telephone using recognition results from said at least one selected speech recognition engine whenever user input is required.

9. The device according to claim 8 and wherein one feature is associated with at least two speech recognition engines and said control unit activates said at least two speech recognition engines in parallel.

10. The device according to claim 8 and comprising a loader to load and unload said speech recognition engines independently of each other.

11. The device according to claim 8 and wherein said features are selected from the group consisting of: MESSAGES, CALENDAR, TO DO, MEMO, FAX and EMAIL.

* * * * *